United States Patent [19]
Bates

[11] 3,767,996
[45] Oct. 23, 1973

[54] LOW FREQUENCY MULTI-PHASE SINEWAVE GENERATOR CIRCUIT

[75] Inventor: James W. Bates, Palos Verdes Estates, Calif.

[73] Assignee: Gulton Industries, Inc., Metuchen, N.J.

[22] Filed: Oct. 28, 1971

[21] Appl. No.: 193,299

[52] U.S. Cl. .............. 321/9 A, 321/5, 321/27 MS, 321/DIG. 1
[51] Int. Cl. ........................................ H02m 1/12
[58] Field of Search ................. 321/5, 5 SW, 9 A, 321/27 MS, DIG. 1

[56] References Cited
UNITED STATES PATENTS

| 3,581,212 | 5/1971 | McMurray | 321/DIG. 1 |
| 3,538,420 | 11/1970 | Klein | 321/9 A |
| 3,579,081 | 5/1971 | Bates | 321/9 A |

Primary Examiner—William M. Shoop, Jr.
Attorney—Sidney Wallenstein et al.

[57] ABSTRACT

A major and at least one minor bridge network is provided each comprising three circuit branches extending between the output of the same source of direct current voltage, each circuit branch having a pair of series connected current control devices like transistors. Three output terminals of a three phase power system are provided at the junctures of the three pairs of current control devices of each bridge circuit network. The three primary windings of a different three-phase transformer are respectively connected across the three combinations of output terminal pairs of each of the bridge circuit networks. The two transformers have different turn ratios to produce outputs of different amplitudes. The pair of current control devices of each circuit branch of each bridge circuit network are rendered conductive in a given alternating repetitive switching sequence which is identical to that used for the other circuit branches of the same bridge circuit network but differeing in phase by 120°. This results in identical alternating pulsed outputs differing in phase by 120° across the primary windings of the associated transformer. The secondary winding associated with each primary winding of the transformer associated with the major bridge circuit network is connected in series with the secondary winding having a similarly phased signal of the transformer associated with each minor bridge circuit network to produce a sinusoidal-like stepped voltage waveform which is filtered to produce a progressively varying sinusoidal-like voltage.

12 Claims, 6 Drawing Figures

INVENTOR
JAMES W. BATES

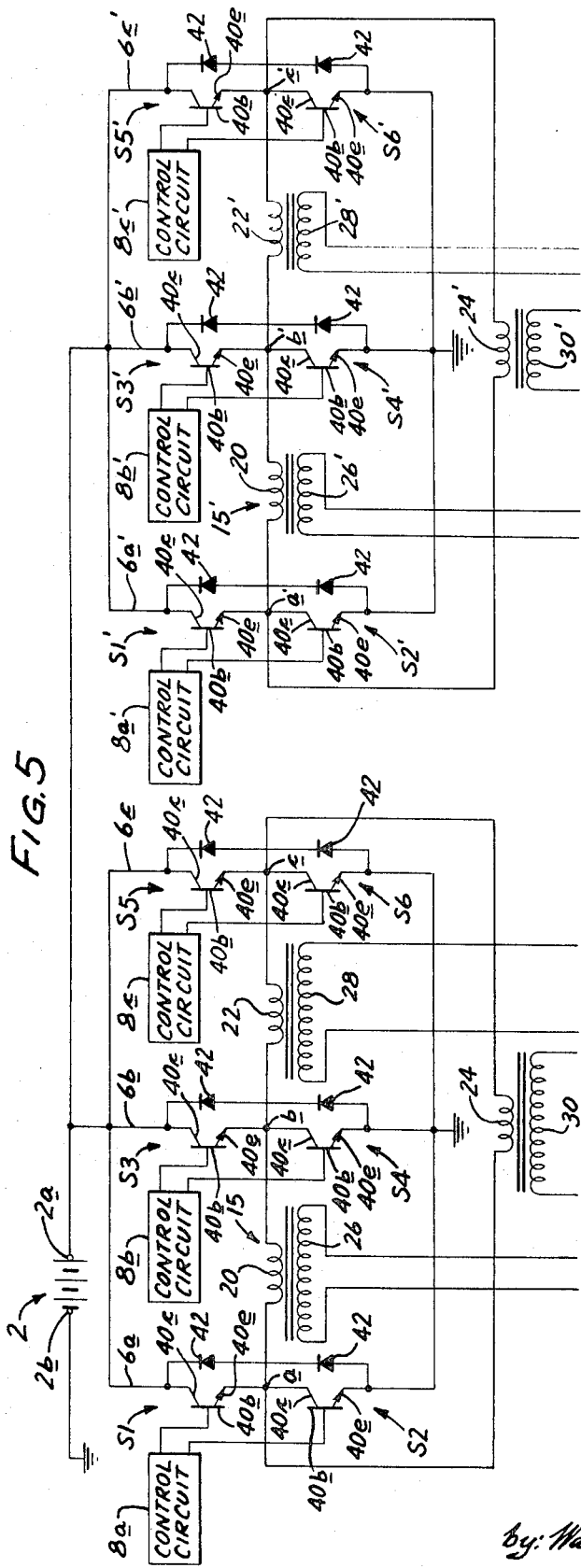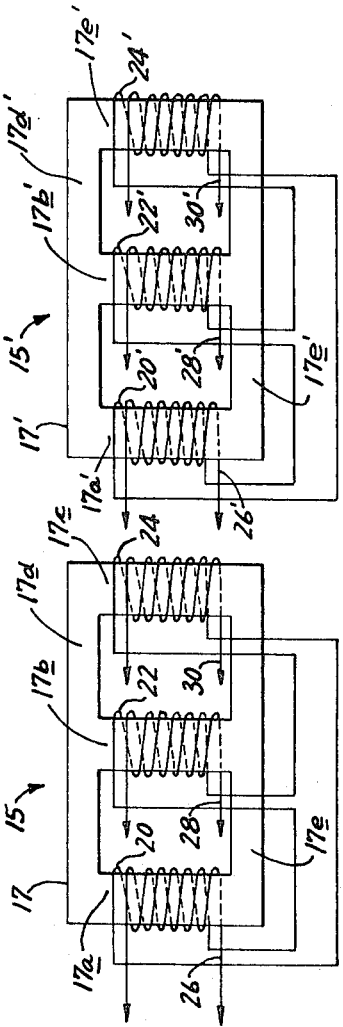
FIG. 5
FIG. 4
INVENTOR
JAMES W. BATES

LOW FREQUENCY MULTI-PHASE SINEWAVE GENERATOR CIRCUIT

This invention relates to apparatus for generating relatively low frequency three phase sinewave signals from a source of direct current, using relatively compact, light-in-weight components.

The present invention has its most important application in direct current powered three phase sinewave power supplies capable of delivering substantial amounts of power for various applications, such as power supplies for satellites and aircraft, where size, weight and/or cost limitations are important considerations.

The generation of low frequency sinewave current of substantial magnitude generally requires extremely bulky equipment, whether it be an electromechanical device, such as motor generator equipment or electronic circuits. Electronic circuits commonly generate sinewave current from the output of a direct current energized square wave generator or inverter circuit whose output appearing across the output of a transformer is filtered to provide a substantially sinusoidal waveform. A more recent development in electronic sinewave generator circuits produce an approximation of a sinewave signal by the superpositioning of a number of square topped pulses of varying width and instantaneously of the same polarity. The pulses are generally added together by connecting in series the secondary windings of a number of transformers whose primary windings are supplied with the pulses to provide a stepped waveform whose general outline resembles a sinewave. Transformers capable of handling substantial amounts of power at frequencies between about 60–400 cycles per second are generally very heavy and bulky. Other electronic sinewave generators have been developed which cannot operate with inductive loads.

The present invention is an application of the inventions of U.S. Pat. No. 3,579,081 granted May 18, 1971 to a three phase power system and involving unique inventions which reduces the cost and increases the reliability over a three phase power system which comprises three identical single phase circuits like that disclosed in this patent operated in phase displaced relation.

U.S. Pat. No. 3,579,081 discloses, as examples of a basic invention involving the production of a sinusoidal-like waveform from a unique combination of pulsed waveforms, several low frequency sinusoidal sinewave generator circuits each comprising a major and one or more minor bridge circuits each comprising two circuit branches including a pair of current control devices connected in series circuit relation across a source of D.C. voltage. Each pair of current control devices of each circuit branch are rendered alternately conductive so only one of these devices is conducting at a time. As disclosed in this patent, the current control devices of the two branch circuits of each bridge circuit are rendered conductive a different number of times each cycle and are therefore controlled by control signals having different waveforms, independently of phase considerations. A voltage of one polarity or another is obtained across the bridge circuit (i.e., across the junctures of the two pairs of current control devices) whenever a non-corresponding pair of current control devices in the two circuit branches involved have overlapping conducting intervals. The waveform produced by the major bridge circuit network is a square top waveform alternating in polarity each successive half cycle, the waveform being of zero amplitude during the first and last 30° intervals thereof and being a flat top pulse of a given reference amplitude between these intervals. This voltage is obtained in the circuits disclosed in this patent by a switching sequence wherein one of the current control devices of each non-corresponding pair of current control devices which have overlapping conducting intervals is alternately rendered conductive for 180° and non-conductive for 180°, and the other of same is rendered conductive for only a centered 120° interval during one half cycle of each cycle and during the first and last 30° intervals during the next half cycle thereof.

At least one minor bridge circuit is provided which produces a pulsed output of a fixed amplitude which is only a fraction of the amplitude of the output of the major bridge circuit and which includes each half cycle a pulse occurring during the first 30° and last 30° intervals thereof (during which the output of the major bridge circuit is zero), and a 60° pulse centered within the half cycle involved. (The polarity of this output reverses the succeeding half cycle). When these outputs of the major and minor bridge circuits are added together, a stepped waveform is produced which resembles a stepped sinusoidal voltage. As disclosed in the aforesaid patent, the switching pattern of the pairs of current control devices of the two branches of the minor bridge circuit involved are, as in the case of the major bridge circuit, different, and require different control signal waveforms which are complex relative to those used to control the major bridge circuit.

Three phase power systems having a very elemental stepped outline not very closely resembling a sinusoidal waveform have been devised using only a single bridge circuit network with three branches each having a pair of current control devices as above described. The current control device of the various branches are controlled by single square wave signals differring in phase by 120° which produces 120° width pulses alternating in polarity each half cycle. However, the production of more sinusoidal-like three phase waveforms by the addition of the outputs of another similar bridge circuit having a more complex control signal waveform was not apparently considered or achieved.

One apparent way to provide a three phase sinusoidal voltage power system would be to utilize three groups of double branched major and minor bridge circuits like one of the circuits disclosed in U.S. Pat. No. 3,579,081, with the phase of the operation of the different groups of bridge circuits varying by 120°. Where a transformer coupled transistor circuit is involved, such a three phase power system utilizing a major bridge circuit and a single minor bridge circuit requires twenty four transistors and three to six single phase transformers.

The present invention provides a unique application of the invention disclosed and claimed in the aforementioned patent which results in a very simple low cost three phase sinusoidal power system requiring only twelve transistors and one or two three phase trnasformers. (Because of flux cancellation in three phase transformers, each three phase transformer is smaller than one of the single phase transformers required in the power system previously described).

In accordance with one of the aspects of the invention, a major and at least one minor bridge circuit network is provided each comprising three circuit branches extending between the output of a source of direct current voltage, each circuit branch having a pair of series connected current control devices like transistors or the like. Three output terminals of a three phase power system are provided at the junctures of the three pairs of current control devices of each bridge circuit network. A unique set of identical 120° phase displaced control signal waveforms was developed for the minor bridge circuit network which produce a set of pulsed waveforms between the three output terminals thereof which when added to the outputs of the major bridge circuit network controlled by single square wave control singals differing in phase by 120° produces identical stepped sinusoidal-like alternating pulsed outputs differing in phase by 120° across the three output terminals of the circuit.

Unlike a single phase voltage generating system, it is believed that it is impractical if not impossible directly to couple the outputs of the major and minor bridge circuit networks in such a three phase voltage generating system. Accordingly, the output of at least one of the bridge circuit networks most advantageously is coupled to the output of the other of same preferably by a three phase transformer or other isolating means. Transformer coupling makes it easy to avoid the use of D.C. to D.C. inverter circuits to provide the different amplitudes required of the outputs of the major and minor bridge circuit networks since a proper selection of the step-up or step-down turns ratio thereof will provide major and minor bridge circuit output components of the proper relative amplitude. Thus, the D.C. inputs to the bridge circuit may be connected to the same source of D.C. voltage and to produce a differentiation in the amplitudes of the component voltages to be added, one or two three phase transformers having the required turns ratio is provided at the output of one or both bridge circuit networks. Where a three phase transformer is used with each of the bridge circuit networks, each secondary winding of each transformer is coupled through the corresponding secondary winding of the other three phase trnasformer across a pair of output terminals. This gives the ultimate user the election of using a delta or Y connection at the output of the three phase voltage system. Where a transformer is used with only the major or minor bridge circuit network, it was unexpectedly discovered that only two of the secondary windings thereof can be utilized. In such case, each secondary winding of the transformer associated with the major or minor bridge circuit network is coupled between a different one of the output terminals of the other bridge circuit network and a main output terminal. A third main output terminal is coupled to the third output terminal of the latter bridge circuit network. An open delta connection to a load circuit can then be made between the main output terminals. Where filtering is desired, filters are connected in the lines extending to the main output terminals or in the connections between the same and the load circuits.

Each three phase transformer has windings on the three legs of a three phase transformer core structure where flux cancellation enables the elimination of one core leg and also results in a lower overall average flux density in the shared portions of the core extending between the core legs, thereby reducing the amount of iron required for a core of a given current capacity.

The above and other features and advantages of the invention will become apparent upon making reference to the specification to follow, the claims and the drawings wherein:

FIG. 4 illustrates the two three phase transformer utilized with the bridge circuit networks shown in FIG. 1;

FIG. 5 is a preferred circuit diagram for the three phase circuit networks shown in FIG. 1.

Figure 1:
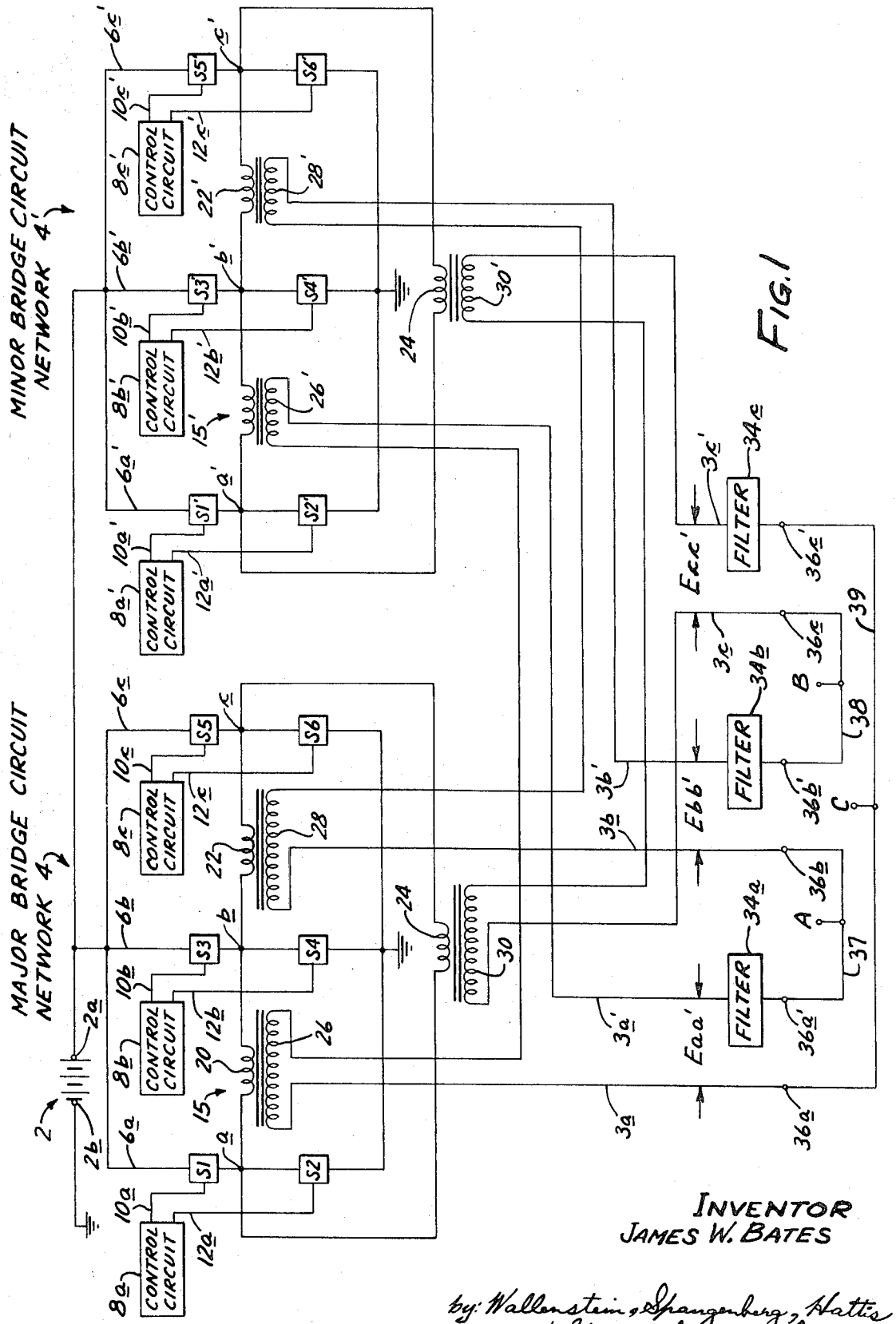
FIG. 1 is a simplified circuit diagram, partly in block form, of a three phase power system having two three phase transformers in accordance with a preferred exemplary form of the present invention.
Figure 3:
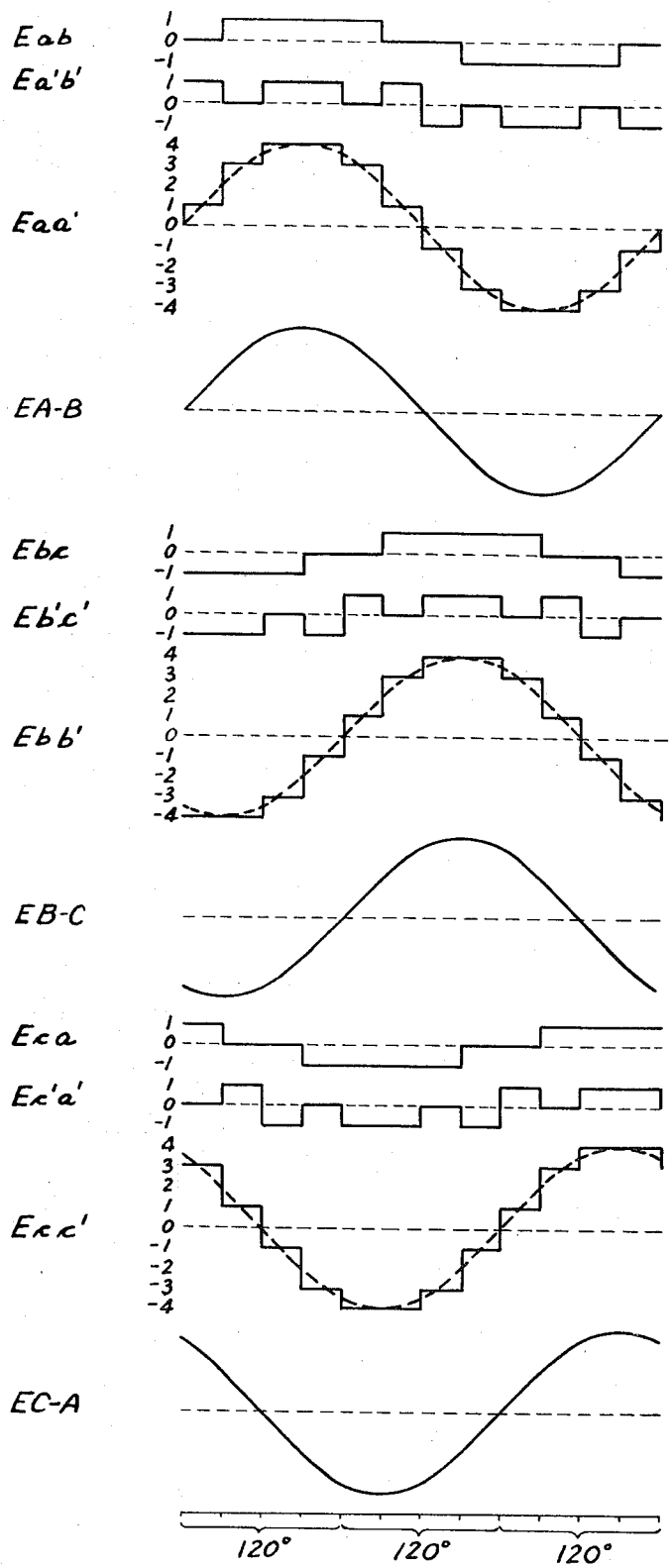
FIG. 3 shows the bridge circuit network output voltages and the unfiltered and filtered summation voltages drawn to a common time base for the circuit of FIG. 1.

Referring now to FIG. 1, a three phase sinusoidal power generating system is thereshown which operates from a low voltage D.C. power supply or battery 2 to produce across three pairs of output lines $3a-3a'$, $3b-3b'$ and $3c-3c'$ stepped sinusoidal-like voltage waveforms $Eaa'$, $Ebb'$ and $Ecc'$ shown in FIG. 3 and across output terminal pairs A–B, B–C and C–A filtered sinusoidal outputs EA–B, EB–C and EC–A shown in FIG. 3. The present invention has its primary utility at relatively low frequencies, particularly frequencies in the general neighborhood of 400 cycles per second, although it is also applicable to lower and higher frequencies. As the frequency decreases from a frequency of this general magnitude, the sizes of the transformers which are used in the invention described become much larger until they reach relatively impractical sizes, and as the frequency increases from this general magnitude a point is reached where other circuits become equally or more practical.

The circuit illustrated in FIG. 1 includes a major bridge circuit network 4 having three output terminals $a$, $b$ and $c$ and a minor bridge circuit network 4' having three output terminals $a'$, $b'$ and $c'$. The major bridge circuit network has three circuit branches $6a$, $6b$ and $6c$ respectively comprising pairs of series connected switches S1–S2, S3–S4, and S5–S6, which are preferably electronic switches like power transistors, connected between one of the terminals $2a'$ (the positive terminal as illustrated) of the battery 2 and the other terminal $2b$ thereof which is shown as being a grounded terminal. The aforementioned output terminals $a$, $b$ and $c$ are connected respectively at the junctures of the switch pairs S1–S2, S3–S4 and S5–S6. Similarly, the minor bridge circuit network has three circuit branches $6a'$, $6b'$ and $6c'$ respectively comprising pairs of series connected switches S1'–S2', S3'–S4' and S5'–S6' identical to the switches used in the major bridge circuit network 4 connected between the terminals $2a$ and $2b$. Control circuit $8a$, $8b$ and $8c$ respectively control the intervals during which the switch pairs S1–S2, S3–S4 and S5–S6 of the major bridge circuit network are rendered conductive and non-conductive. Similarly, control circuits $8a'$, $8b'$ and $8c'$ respectively control the intervals during which the switch pairs S1'–S2', S3'–S4' and S5'–S6' of the minor bridge circuit network 4' are rendered conductive and non-conductive.

Figure 2:
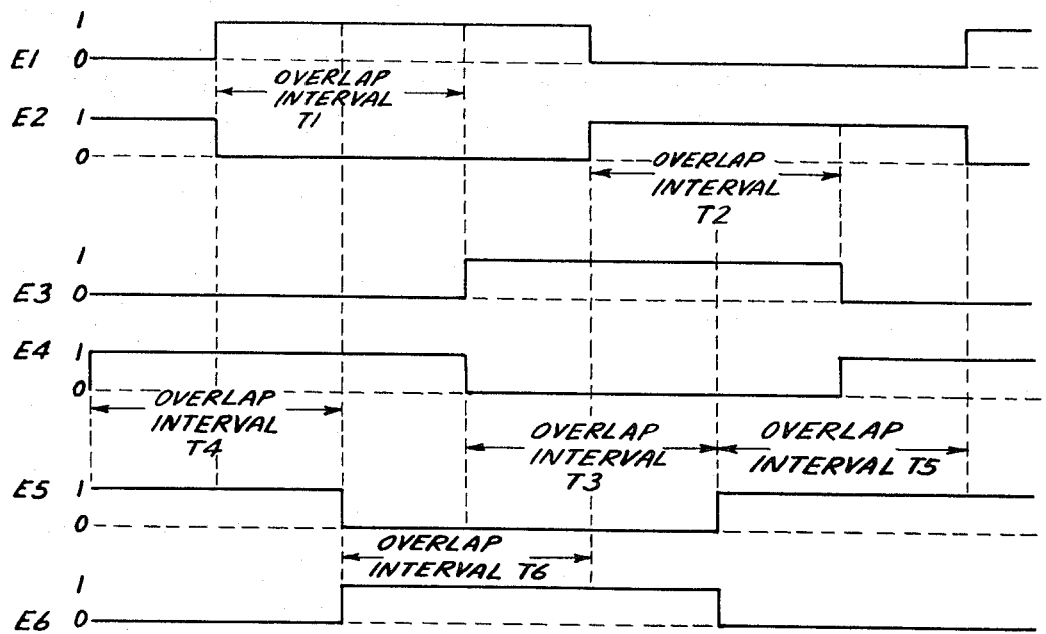
FIG. 2 shows various control voltage waveforms drawn to a common time base which are present in the circuit of FIG. 1.
Figure 2:
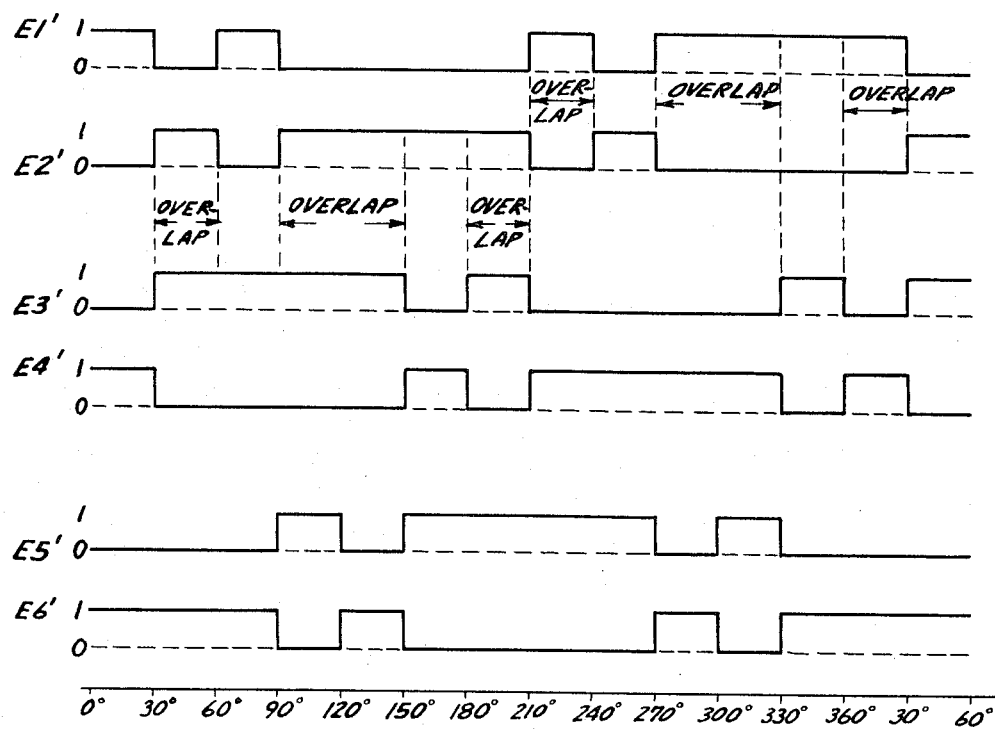

Control circuit 8a has control signal output lines 10a and 12a which respectively control the operation of the switches S1 and S2 in a manner illustrated respectively by control voltage waveforms E1 and E2 in FIG. 2 where the zero amplitude portions of these waveforms represent the intervals during which the switches involved are non-conductive and the "1" amplitude portions of these waveforms represent the intervals during which the associated switches are conductive. Accordingly, as illustrated, the switches S1 and S2 of the major bridge circuit network 4 are alternately rendered conductive for 180° during successive half cycles.

Control circuit 8b has a pair of control signal output lines 10b and 12b respectively extending to switches S3 and S4 in bridge circuit branch 6b to control the same in accordance with control signal waveforms E3 and E4 where the conductive states of these switches are respectively represented by the zero and "1" amplitude portions of the control signal waveforms E3 and E4. It is thus apparent that the switches S3 and S4 are rendered alternately conductive for 180° intervals which are spaced 120° from the corresponding intervals of the corresponding switches S1 and S2 in bridge circuit branch 6a. Similarly, control circuit 8c has control signal output lines 10c and 12c respectively connected to the switches S5 and S6 in bridge circuit branch to control the conductive and non-conductive thereof in accordance with the control signal waveforms E5 and E6 of FIG. 2 which are identical to the control signal waveforms E3 and E4 except displaced 120° therefrom. Accordingly, the switches S5 and S6 are respectively rendered conductive for 180° intervals during alternate half cycles which are spaced 120° from the conducting intervals of the corresponding switches S3 and S4. It is seen from FIG. 2 that the control signal waveforms E5 and E6 are spaced 120° from the control signal waveforms E1 and E2 associated with the bridge circuit branch 6a so that the switches S5 and S6 are rendered alternately conductive over 180° intervals spaced 120° from the corresponding switches S1 and S2 of the bridge circuit branch 6a.

A positive voltage appears between the major bridge circuit network bridge output terminals a and b during the overlapping intervals of conduction of the non-corresponding or diagonally related switches S1 and S4 in the bridge circuit branches 6a and 6b, and a negative voltage appears between the ouput terminals a and b during the overlapping intervals of conduction of the non-corresponding or diagonally related switches S3 and S2 in these same branches. A positive voltage producing overlapping interval of conduction is shown by interval T1 in FIG. 2 when the waveform E1 and E4 are simultaneously in the "1" amplitude state. A negative voltage producing overlapping interval of conduction is shown by interval T2 in FIG. 2 when the waveforms E2 and E3 are simultaneously in the "1" amplitude state.

The voltage waveform appearing across terminals a and b is illustrated by waveform Eab in FIG. 3 which shows that the waveform comprises flat topped pulses alternating in polarity each half cycle, with each pulse occupying the middle 120° interval of the half cycle involved. The output across terminals a and b is zero during the first and last 30° interval of each half cycle.

A positive voltage appears between the major bridge circuit output terminals b and c during the overlapping intervals of condition of the non-corresponding or diagonally related switches S3 and S6 of the bridge circuit branches 6b and 6c, occurring during the "1" amplitude overlap intervals of the control signal waveforms E3 and E6 exemplified by interval T3 in FIG. 2. A negative voltage appears across the output terminals b and c during the overlapping intervals of conduction of the non-corresponding switches S4 and S5 of the bridge circuit branches 6b and 6c, occurring during the "1" amplitude overlap intervals of the control signal waveforms E4 and E5 exemplified by interval T4 in FIG. 2. Waveform Ebc shown in FIG. 3 represents the voltage waveform appears across the terminals b and c of the major bridge circuit network 4 during a one cycle interval.

A positive voltage appears between the major bridge circuit network terminals c and a through the overlapping intervals of conduction of the non-corresponding or diagonally related switches S5 and S2 of the bridge circuit branches 6c and 6a occurring during the "1" amplitude overlap intervals of the control signal waveforms E5 and E2 exemplified by interval T5 in FIG. 2. A negative voltage appears across the output terminals c and a during overlapping intervals of conduction of the non-corresponding switches S6 and S1 of the bridge circuit branches 6c and 6a occurring during the "1" amplitude overlap intervals of the control signal waveforms E6 and E1 exemplified by interval T6 in FIG. 2. The waveform Eca shown in FIG. 3 represents the voltage waveform appearing across the terminal c and a of a major circuit network during a one cycle period. An examination of the waveforms Eab, Ebc and Eca in FIG. 3 indicates that these waveforms are of identical shape except that they are displaced 120° from one another.

To obtain stepped sinusoidal-like voltages from the waveforms Eab, Ebc and Eca shown in FIG. 3, it is necessary to add to these respective waveforms pulsed waveform components Ea'b', Eb'c' and Ec'a' shown in FIG. 3 generated respectively between the output terminals a'–b', b'–c' and c'–a' of the minor bridge circuit network 4' in FIG. 1, but having about one third the amplitude of the waveforms Eab, Ebc and Eca. Waveforms Eaa', Ebb' and Ecc' in FIG. 3 indicate the desired summation of stepped sinusoidal-like waveform to be produced. If the waveforms Ea'b', Eb'c' and Ec'a' as illustrated have the same amplitude as the waveforms Eab, Ebc and Eca, either the amplitudes of latter waveforms must be multiplied by three or the amplitudes of the former waveforms must be reduced to one-third their value. This difference in amplitude is obtained preferably by means of transformers associated with the major and minor bridge circuit networks 4 and 4' having step-up ratios differing by 3.

The control of the minor bridge circuit network will now be explained. Control circuits 8a', 8b' and 8c' thereof are provided with control signal output lines 109'–12a', 10b'–12b', and 10c'–12c' respectively extending to the switch pairs S1'–S2', S3'–S4' and S5'–S6' for controlling the conduction and non-conduction thereof in accordance with the control signal waveform pairs E1'–E2', E3'–E4' and E5'–E6' shown in FIG. 2, which are mirror images of one another to produce alternating conduction of the associated switch pairs. As in the case of the control signal waveforms of the major bridge circuit network, the control signal waveforms generated by the control circuits 8a', 8b' and 8c' are identical but 120° apart in phase and, as illustrated vary in amplitude between a zero reference amplitude and a "1" amplitude. The switching pattern of each of the switch devices of the minor bridge circuit network 4' is most advantageously two 30° conductive intervals spaced 120° apart for a half cycle of each cycle, and a 120° wide conductive interval centered within the next half cycle period. To this end, as shown in FIG. 2, each control signal waveform comprises two 30° wide "1" amplitude pulses spaced apart 120° during every other half cycle and 120° wide "1" amplitude pulses centered in the intervening half cycles. Additionally, the 30° conducting and "1" amplitude control signal intervals of each switch device and associated control signal waveform of the minor bridge circuit network 4' occurs during the first and last 30° intervals of the 180° wide conducting "1" amplitude intervals of the corresponding switch device and control signal waveform of the major bridge circuit network 4. Also, the 120° conducting and "1" amplitude control signal intervals of each switch device and associated control signal waveform of the minor bridge circuit network 4' is centered during the 180° non-conducting and "0" amplitude intervals of the corresponding switch device and control signal waveform of the major bridge circuit network 4. Accordingly, the identical switching patterns of the corresponding switch devices of the various branches 6a', 6b' and 6c' of the minor bridge circuit network 4' are 120° out of phase.

In the preferred form of the invention where the D.C. input to both of the bridge circuit networks 4 and 4' is the same voltage source, such as a low voltage battery, where a much higher three phase sinusoidal voltage is desired a three phase voltage step-up transformer 15 (which can be referred to as amplitude differentiating means) is provided for the major bridge circuit network 4 and a three phase voltage step-up transformer 15' is provided for the minor bridge circuit network 4', the step-up ratios of the windings of transformer 15 being three times that of the transformer 15'. As illustrated in FIG. 4, the preferred three phase transformers 15 and 15' respectively have cores 17 and 17' with three parallel legs 17a–17b–17c and 17a'17b'–17c' interconnected by outer legs 17d and 17e and 17d' and 17e', respectively. Primary windings 20, 22 and 24 are respectively wound around the legs 17a, 17b and 17c and secondary windings 26, 28 and 30 are respectively wound around the core legs 17a 17b and 17c of transformer 15 to be in direct coupled relationship with the associated primary windings 20, 22 and 24. Similarly, primary windings 20', 22' and 24' of transformer 15' are respectively wound around the core legs 17a', 17b' and 17c', and secondary windings 26', 28' and 30' are respectively wound around core legs 17a', 17b' and 17c' in immediate conductive relationship to the aforementioned primary windings 20', 22' and 24'. Primary windings 20 and 20' of the transformers 15 and 15' are respectively connected across the major and minor bridge circuit network output terminal pairs a –b and a'–b', the primary windings 22 and 22' thereof are respectively connected across the major and minor bridge circuit network output terminal pairs b–c and b'–c' and primary windings 24 and 24' thereof are respectively connected across the major and minor bridge circuit network output terminal pairs c–a and c'–a', to form a three phase delta primary winding connection.

The corresponding pairs of secondary windings 26–26', 28–28' and 30–30' associated with the corresponding phases of the outputs of the bridge circuit networks 4 and 4' are connected in series circuit relationship across the aforesaid output lines 3a–3a', 3b–3b' and 3c–3c'. The aforementioned stepped voltage waveforms Ea', Eb' and Ec' shown in FIG. 3 respectively appear across the output lines 3a–3a', 3b–3b' and 3c–3c'. Filter networks 34a, 34b and 34c are preferably connected respectively in series with the latter output lines to remove the ripple component of the stepped voltage waveforms shown and provide across pairs of output terminal 36a–36a', 36b–36b' and 36c–36c' sinusoidal voltage waveforms EA–B, EB–C and EC–A shown in FIG. 3.

The latter pairs of output terminals may be Y connected or, as illustrated, delta connected by the conductors 37, 38 and 39 respectively interconnecting the terminals pairs 36a–36b, 36b'14 36c and 36c'–36a. The three phase output terminals A, B, and C are respectively connected to the conductors 37, 38 and 39.

Although a variety of different types of switches could be used for switches S1, S2, etc., in the preferred exemplary form of the present invention transistors as utilized, as shown in FIG. 5. Thus, as there indicated, each of the branches of the various bridge networks include a pair of series connected NPN transistors. The emitter 40e and collector 40c of the uppermost transistor in each branch are respectively connected between the positive terminal of the battery 2 and the collector 40c of the lowermost transistor whose emitter 40e is connected to the ground. Connected across the emitter and collector of each transistor is a diode 42 whose cathode and anode are respectively connected to the collector and emitter of the associated transistor so as to carry reverse current flow caused by out-of-phase current components when reactive loads are connected to the three phase power supply shown therein. The output lines of the control circuits 8a, 8b, etc., on which the various previously described control signal waveforms appear extend to the bases 40b of the associated NPN transistors. The "1" amplitude portions of these waveforms would be of a positive polarity where NPN transistors are used.

As previously indicated, the embodiment of the invention shown in the drawings and just described is the most preferred form thereof because the coupling of the inputs of both the major and minor bridge circuit networks directly to the outputs of the same D.C. power supply eliminates the need for a D.C. to D.C. converter, and the use of two three phase transformers with different winding turns ratios at the outputs of the bridge circuit networks provides separate pairs of output terminals which can be Y or delta connected. However, the broader aspects of the invention envision, among other things, the use of a single three phase step-down transformer at the output of either bridge circuit network with the secondary windings thereof being connected in series directly with the outputs of the major bridge circuit network, or the use of a D.C. to D.C. converter to provide different D.C. inputs to the major and minor bridge circuit networks, making unnecessary the use of transformers for amplitude differentiation. Where a transformer is connected only to the output of the major bridge circuit network, only two windings of the transformer can be used with an open delta connection.

Figure 6:
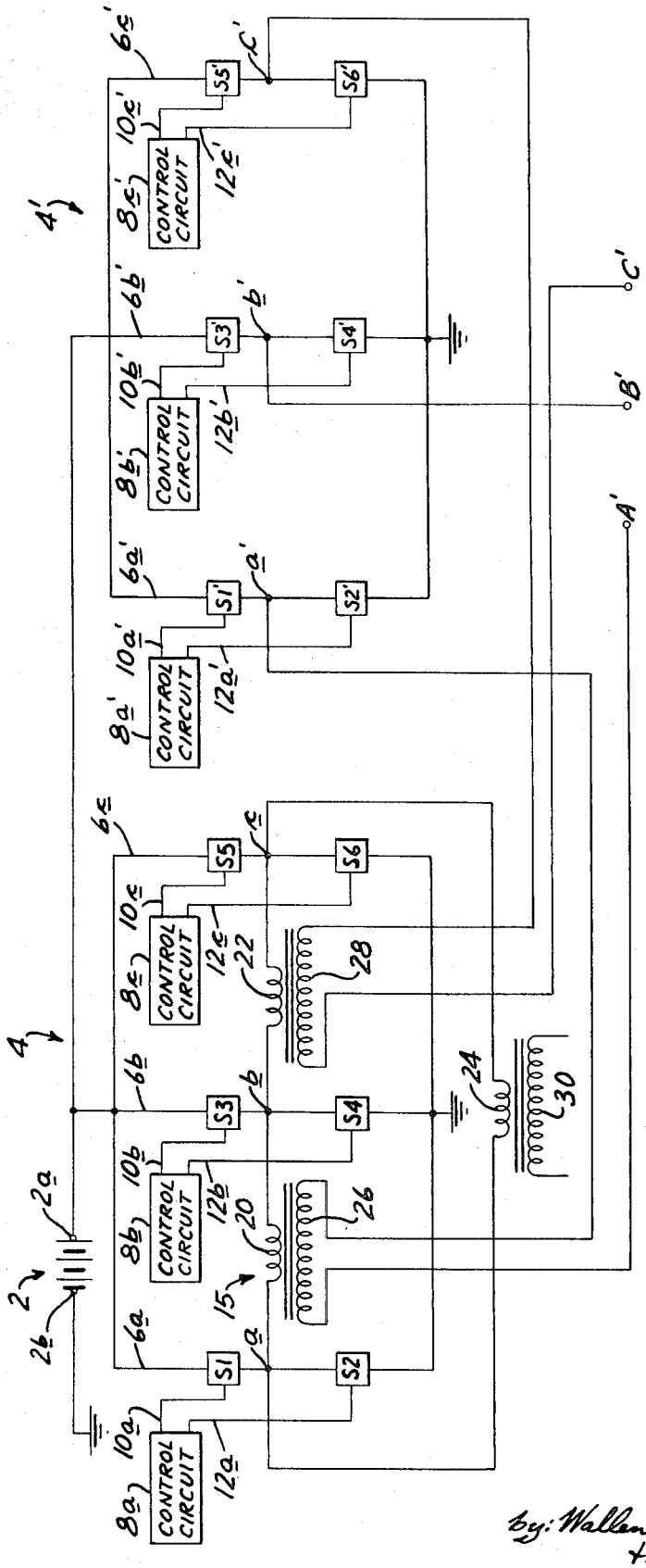
FIG. 6 is a simplified circuit diagram showing an embodiment of the invention using only one three phase transformer.

Refer now to FIG. 6 which shows a simplified circuit diagram of the form of the invention referred to where only one three phase transformer 15 is utilized with the major bridge circuit network. (It is understood that a similar circuit arrangement would be provided where a transformer is used with only the minor bridge circuit network.) Only the secondary windings 26 and 28 of the three phase transformer 15 associated with the major bridge circuit network are utilized in connection to the minor bridge circuit network. Thus, the winding 26 is connected between output terminal $a'$ of the minor bridge circuit network and a main output terminal $A'$. Similarly, the secondary winding 28 is connected between the output terminal $c'$ of the minor bridge circuit network and a main output terminal $C'$. A main output terminal $B'$ is connected directly to the minor bridge circuit network output terminal $b'$. It was discovered that if the third secondary winding 30 of the transformer 15 were to be connected into the minor bridge circuit network, a cancellation effect occurs which fails to provide the proper three phase output.

It should thus be understood that numerous modifications may be made in the most preferred form of the invention shown in the drawings and described above without deviating from the broader aspects of the invention.

I claim:

1. A three phase voltage generating system comprising: a major and a minor bridge circuit network, each bridge circuit network comprising three circuit branches extending between a pair of D.C. voltage input terminals, each bridge circuit branch including a pair of series connected current control devices, three output terminals respectively at the junctures of the three pairs of current control devices of each bridge circuit network which output terminals constitute three pairs of output terminals of three two-branched bridge circuits formed by the three different combinations of circuit branches of each bridge circuit network, first and second groups of control means for respectively alternately rendering conductive and non-conductive the pairs of current control devices in the branch circuits of the major and minor bridge circuit networks, wherein only one of the current control devices of each such pair of current control devices is conductive or non-conductive at any given instant other than the instants where a change of conduction is taking place, said first group of control means associated with the major bridge circuit network rendering the corresponding current control devices in the various branch circuits thereof conductive and non-conductive in identical cyclically varying conduction patterns spaced 120° apart, said second group of control means associated with the minor bridge circuit network rendering the corresponding current control devices in the branch circuits thereof conductive and non-conductive in identical cyclically varying conduction patterns spaced 120° apart and respectively in corresponding phase relationship with, but in different complementary conduction patterns than, the conduction patterns of the current control devices in the branch circuits of the major bridge circuit network, and summation means for providing three resultant substantially identical sinusoidal-like waveforms differing in phase by 120° and each including added together components derived from the outputs at the corresponding pairs of output terminals of the major and minor bridge circuit networks.

2. The three phase voltage generating system of claim 1 wherein there is provided amplitude differentiating means for providing correspondingly phased voltage components of different amplitudes which are added by said summation means, the added together voltage components derived from the major bridge circuit network having an amplitude several times greater than the amplitude of the voltage components from the minor bridge circuit network.

3. The three phase voltage generating system of claim 2 wherein said amplitude differentiating means includes at least one three phase transformer having three primary windings respectively connected across said three pairs of output terminals of one of said bridge circuit networks and associated secondary windings, and means respectively coupling at least two of said secondary windings to different pairs of output terminals of the other bridge circuit network.

4. The three phase voltage generating system of claim 1 wherein said summation means includes a pair of three phase transformers having primary and secondary windings, the primary windings of said pair of transformers being coupled respectively across the different pairs of output terminals of said major and minor bridge circuit networks, and means connecting the corresponding secondary windings of the pair of transformers in series circuit relationship with such series circuits extending to three different respective pairs of output terminals adapted to be Y or delta connected.

5. The three phase voltage generating system of claim 2 wherein said D.C. voltage input terminals for said major and minor bridge circuit networks are connected to the output of the same D.C. voltage source, and said summation means includes a pair of three phase transformers having primary and secondary windings with different respective turns ratios, the primary windings of said pair of transformers being coupled respectively across the different pairs of output terminals of said major and minor bridge circuit networks, and means connecting the corresponding secondary windings of the pair of transformers in series circuit relationship with such series circuits extending to three different respective pairs of output terminals adapted to be Y or delta connected.

6. The three phase voltage generating system of claim 1 wherein said pairs of current control devices in each branch circuit are transistors whose emitter and collectors are connected in series current conduction aiding relation and said first and second group of control means are control signal generating means having waveforms corresponding to the desired conduction patterns of the transistors controlled thereby.

7. The three phase generating system of claim 1 wherein said summation means includes a single three phase transformer associated with one of the bridge circuit networks, said transformer having three pairs of primary windings and at least a pair of secondary windings, the primary windings of said transformer being coupled respectively across the different pairs of output terminals of said bridge circuit networks, and means coupling said pair of said secondary windings respectively between different pairs of output terminals of the other bridge circuit network and different main output terminals, and a third main output terminal coupled to the other output terminal of said other bridge circuit network.

8. A three phase voltage generating system comprising: a major and a minor bridge circuit network, each bridge circuit network comprising three circuit branches extending between a pair of D.C. voltage input terminals, each bridge circuit branch including a pair of series connected current control devices, three output terminals respectively at the junctures of the three pairs of current control devices of each bridge circuit network which output terminals constitute three pairs of output terminals of three two-branched bridge circuits formed by the three different combinations of circuit branches of each bridge circuit network, first and second groups of control means for respectively alternately rendering conductive and non-conductive the pairs of current control devices in the branch circuits of the major and minor bridge circuit networks, wherein only one of the current control devices of each such pair of current control devices is conductive or non-conductive at any given instant other than the instants where a change of conduction is taking place, said first group of control means associated with the major bridge circuit network rendering the corresponding current control devices in the various branch circuits thereof conductive and non-conductive in identical cyclically varying conduction patterns spaced 120° apart, one cycle of the conduction pattern of each such current control device being 180° of conduction followed by 180° of non-conduction; said second group of control means associated with the minor bridge circuit network rendering the corresponding current control devices in the branch circuits thereof conductive and non-conductive in identical cyclically varying conduction patterns spaced 120° apart and respectively in corresponding phase relationship with, but in different complementary conduction patterns than, the conduction patterns of the current control devices in the branch circuits of the major bridge circuit network, one cycle of the conduction pattern of each current control device of the minor bridge circuit network comprising relatively short conducting intervals at the beginning and end of a conducting half cycle of the correspondingly phase current control device of the major bridge circuit network and a relatively long half cycle centered conducting interval preceded and followed by relatively short non-conducting intervals for the other half cycle during which the correspondingly phased current control device in the major bridge circuit network is non-conductive, and summation means for providing three resultant substantially identical sinusoidal-like waveforms differing in phase by 120° and each including added together components derived from the outputs at the corresponding pairs of output terminals of the major and minor bridge circuit networks.

9. The three phase voltage generating system of claim 8 wherein said summation means includes a pair of three phase transformers having primary and secondary windings, the primary windings of said pair of transformers being coupled respectively across the different pairs of output terminals of said major and minor bridge circuit networks, and means connecting the corresponding secondary windings of the pair of transformers in series circuit relationship with such series circuits extending to three different respective pairs of output terminals adapted to be Y or delta connected.

10. The three phase voltage generating system of claim 8 wherein there is provided amplitude differentiating means for providing correspondingly phased voltage components of different amplitudes which are added by said summation means, the added together voltage components derived from the major bridge circuit network having an amplitude several times greater than the amplitude of the voltage components from the minor bridge circuit network.

11. The three phase voltage generating system of claim 9 wherein said D.C. voltage input terminals for said major and minor bridge circuit networks are connected to the output of the same D.C. voltage source, and said summation and amplitude differentiating means include a pair of three phase transformers having primary and secondary windings with different respective turns ratios, the primary windings of said pair of transformers being coupled respectively across the different pairs of output terminals of said major and minor bridge circuit networks, and means connecting the corresponding secondary windings of the pair of transformers in series circuit relationship with such series circuits extending to three different respective pairs of output terminals adapted to be Y or delta connected.

12. The three phase generating system of claim 8 wherein said summation means includes a single three phase transformer associated with one of the bridge circuit networks said transformer having primary and secondary windings, the primary windings of said pair of transformers being coupled respectively across the different pairs of output terminals of said major and minor bridge circuit networks, and means coupling only a pair of said secondary windings respectively between different output terminals of the other bridge circuit network and different main output terminals, and a third main output terminal coupled to the other output terminal of said other bridge circuit network.

* * * * *